US012584352B2

(12) United States Patent
Steinberg

(10) Patent No.: US 12,584,352 B2
(45) Date of Patent: Mar. 24, 2026

(54) MOTORIZED DOOR SCREEN AND SHADE ASSEMBLY

(71) Applicant: Samuel Steinberg, Escondido, CA (US)

(72) Inventor: Samuel Steinberg, Escondido, CA (US)

( * ) Notice: Subject to any disclaimer, the term of this patent is extended or adjusted under 35 U.S.C. 154(b) by 289 days.

(21) Appl. No.: 18/131,033

(22) Filed: Apr. 5, 2023

(65) Prior Publication Data

US 2024/0337152 A1 Oct. 10, 2024

(51) Int. Cl.
*E06B 9/72* (2006.01)
*E06B 9/11* (2006.01)

(52) U.S. Cl.
CPC . *E06B 9/72* (2013.01); *E06B 9/11* (2013.01)

(58) Field of Classification Search
CPC ..... E06B 9/72; E06B 9/54; E06B 9/11; E06B 9/56; E06B 9/42; E06B 9/50; E06B 2009/543; E06B 9/58; A47H 5/03
See application file for complete search history.

(56) References Cited

U.S. PATENT DOCUMENTS 6,059,007 A * 5/2000 Tomita ...................... E06B 9/54 160/264
6,478,070 B2 * 11/2002 Poppema ................ E06B 9/581 160/31
6,938,667 B2 * 9/2005 Sugiyama ................. E06B 9/54 160/302
7,861,761 B2 * 1/2011 Martineau ................. E06B 9/54 160/31
8,011,413 B2 * 9/2011 Poppema .................. E06B 9/58 160/31
9,351,599 B2 * 5/2016 Roberts ...................... E06B 9/54
9,624,722 B2 * 4/2017 Hummel ................... E06B 9/58
10,047,558 B2 * 8/2018 Hummel ................... E06B 3/80
10,920,488 B2 * 2/2021 Toda ......................... E06B 9/54
11,105,148 B2 * 8/2021 Shipman ................... E06B 9/42
11,555,350 B2 * 1/2023 Fan ........................... E06B 9/44
11,920,406 B2 * 3/2024 Smith ........................ E06B 9/54
2004/0154753 A1 * 8/2004 Tagtow ..................... E06B 9/54 160/23.1
2011/0100570 A1 * 5/2011 Licciardi Di Stefano .................. E06B 9/581 160/368.1
2016/0032646 A1 * 2/2016 Fleischman ............... E06B 9/68 16/96 R
2016/0265275 A1 * 9/2016 Rosell Rosell ........... E06B 9/78
2017/0211315 A1 * 7/2017 Fleischman ............... E06B 9/13
2019/0292846 A1 * 9/2019 Conrad ..................... E06B 9/50
2019/0301242 A1 * 10/2019 Shipman ................... E06B 9/50
2020/0408037 A1 * 12/2020 Roberts ..................... E06B 9/90

* cited by examiner

*Primary Examiner* — Beth A Stephan
(74) *Attorney, Agent, or Firm* — The Rapacke Law Group, P.A.

(57) ABSTRACT

A motorized door shade assembly is disclosed, including a housing containing a motor. The motor operates a gear assembly to open and close a shade screen via a pull bar. Two or more springs biased to pull the pull bar, the pull bar moving along a track system configured to lock a zipper into at least one track. The pull bar moves horizontally to open and close the shade screen.

15 Claims, 12 Drawing Sheets

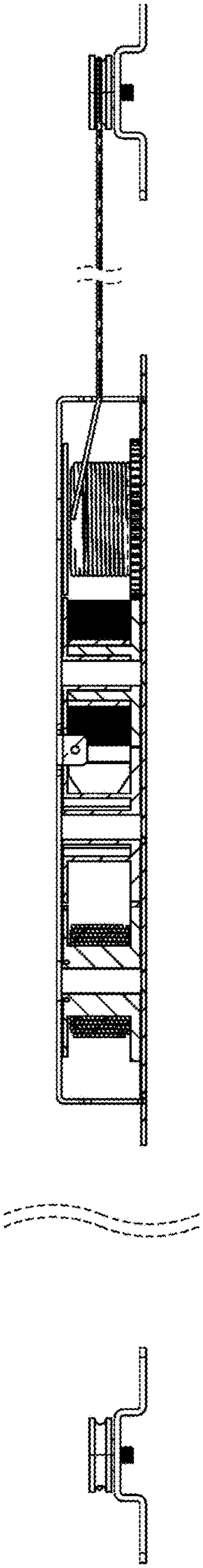
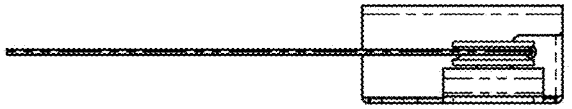
FIG. 22
FIG. 23
FIG. 21

MOTORIZED DOOR SCREEN AND SHADE ASSEMBLY

TECHNICAL FIELD

Embodiments of the invention relate to motorized door shades and screens.

BACKGROUND

Windows and doors having windows often have screens, shades, or blinds which allow the user to selectively cover the window. Some systems are manually operated while more advanced systems use an electric motor to open and close the shade or screen. The shade may be constructed of various materials which partially or fully block light from the window.

SUMMARY OF THE INVENTION

This summary is provided to introduce a variety of concepts in a simplified form that is disclosed further in the detailed description of the embodiments. This summary is not intended for determining or limiting the scope of the claimed subject matter.

The embodiments provided herein relate to a motorized door shade assembly is disclosed, including a housing containing a motor. The motor operates a gear assembly to open and close a shade screen via a pull bar. Two or more springs biased to pull the pull bar, the pull bar moving along a track system configured to lock a zipper into at least one track. The pull bar moves horizontally to open and close the shade screen.

The motor allows for the automated opening and closing of the shade without the need for manual operation, thus providing a convenient and efficient means of selectively permitting the ingress of light through the window of a door.

In some aspects, the motor permits lateral movement of the shade screen rather than up and down movement. This lateral movement provides an advantage over up and down movement by allowing for faster ingress and egress through the opening.

In some aspects, the shade screen is constructed of a sufficiently flexible material to be retained within the housing.

In some aspects, the housing contains a roller to roll and unroll the shade screen when transitioning between an extended position and a retracted position.

In some aspects, the track system is positioned on a top portion and a bottom portion of the housing.

In some aspects, the track system is comprised of one or more channels to permit the sliding engagement between the track system and the shade screen.

In some aspects, the gear system is comprised of a plurality of gears operated via the motor, the gear system contained within the housing.

In some aspects, the gear system is attached to a wire connected to the pull bar to move the pull bar between the retracted position and the extended position.

In some aspects, the gear system includes a plurality of pulleys to receive the wire.

In some aspects, the motorized door shade assembly may be constructed using pet resistant materials and is capable of withstanding wear and tear from long-term use. The pet-resistant material may be useful in prevents animal and pet chewing, scratching, or damage from stains.

In some aspects, the motorized door shade assembly may be water repellant, water resistant, and/or waterproof such as by being constructed of water repellant, water resistant, and/or waterproof materials or provided with water repellant, water resistant, and/or waterproof coatings.

In some aspects, the motorized door shade assembly is bug-proof and/or pug-resistant as to not permit bugs to travel through the screen material. In such, the motorized door shade assembly acts as a barrier to bugs and similar pests to protect their ingress into an environment.

In some aspects, the housing receives the shade screen when in a retracted configuration such that the shade screen is hidden within the housing. This configuration may allow for unobstructed view through the window or opening.

Other objects and advantages of the various embodiments of the present invention will become obvious and intuitive to the reader and it is intended that these objects and advantages are within the scope of the present invention.

BRIEF DESCRIPTION OF THE DRAWINGS

A complete understanding of the present embodiments and the advantages and features thereof will be more readily understood by reference to the following detailed description when considered in conjunction with the accompanying drawings wherein:

FIG. 21 illustrates a detail view of the gear assembly and pull bar, according to some embodiments;

FIG. 22 illustrates a side elevation view of the pull bar, according to some embodiments;

FIG. 23 illustrates a side elevation view of the pull bar, according to some embodiments.

DETAILED DESCRIPTION

Figure 1:
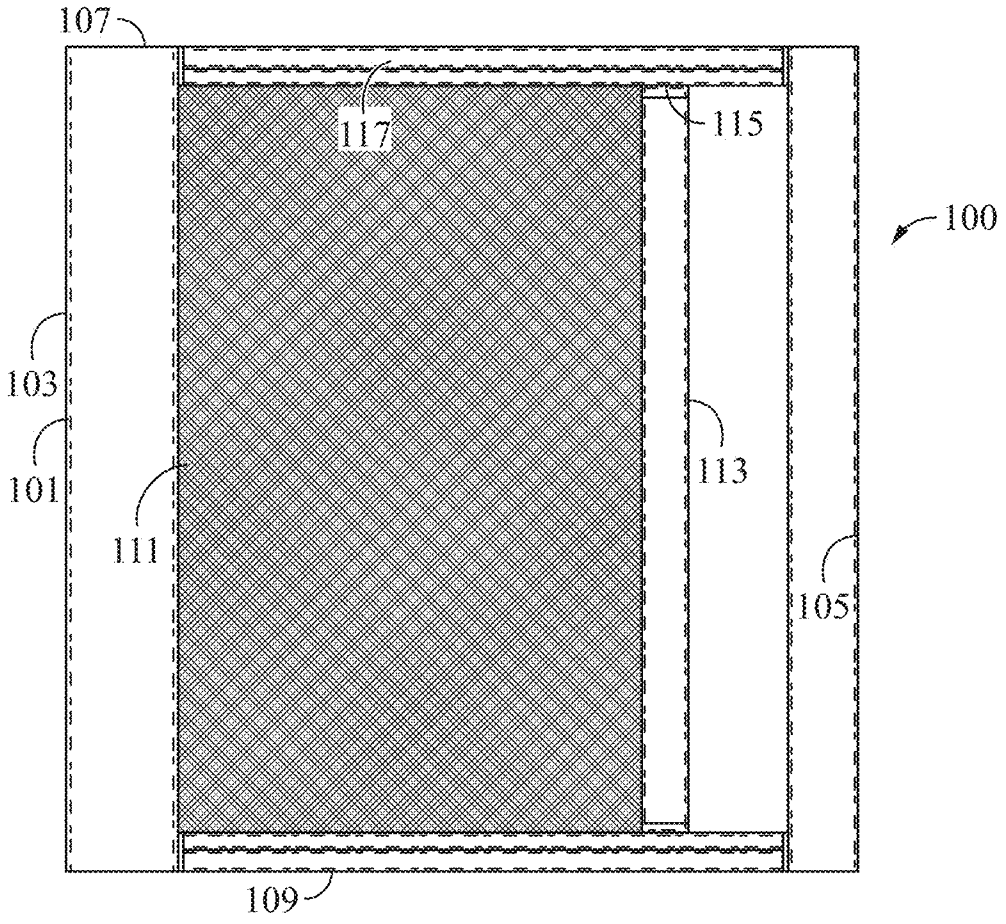
FIG. 1 illustrates a front elevation view of the motorized door screen and shade assembly, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided here relate to a motorized door shade assembly is disclosed, including a housing containing a motor. The motor operates a gear assembly to open and close a shade screen via a pull bar. Two or more springs biased to pull the pull bar, the pull bar moving along a track system configured to lock a zipper into at least one track. The pull bar moves horizontally to open and close the shade screen. The motor allows for the automated opening and closing of the shade without the need for manual operation, thus providing a convenient and efficient means of selectively permitting the ingress of light through the window of a door.

In some embodiments, the motorized door shade assembly may be constructed using pet resistant materials and is capable of withstanding wear and tear from long-term use. The pet-resistant material may be useful in prevents animal and pet chewing, scratching, or damage from stains. One skilled in the arts will readily understand that the materials used for the shade screen may be constructed of various materials known in the arts which partially or fully block light when deployed. The shade screen may be a screen having small openings allowing small amounts of light or may be a solid material which completely blocks light.

In some aspects, the motorized door shade assembly may be water repellant, water resistant, and/or waterproof such as by being constructed of water repellant, water resistant, and/or waterproof materials or provided with water repellant, water resistant, and/or waterproof coatings.

In some aspects, the motorized door shade assembly is bug-proof and/or pug-resistant as to not permit bugs to travel through the screen material. In such, the motorized door shade assembly acts as a barrier to bugs and similar pests to protect their ingress into an environment.

In some aspects, the housing receives the shade screen when in a retracted configuration such that the shade screen is hidden within the housing. This configuration may allow for unobstructed view through the window or opening.

FIG. 1 illustrates a front elevation view of the motorized door screen and shade assembly 100 (which may be hereinafter referred to as "assembly" or "the assembly"). The assembly 100 includes a housing 101 having a left side portion 103, right side portion 105, top portion 107, and bottom portion 109. The shade screen 111 moves horizontally between the left side portion 103 and right side portion 105. A pull bar 113 connects via a zipper 115 to the shade screen 111 and moves along a track system 117 and while the shade screen moves between the extended and retracted positions. A partially extended configuration is illustrated in FIG. 1.

In some embodiments, the pull bar 113 is operated by a gear system (described herein) which is powered by a motor. The pull bar 113 may also be manually pulled by the user.

Figure 2:
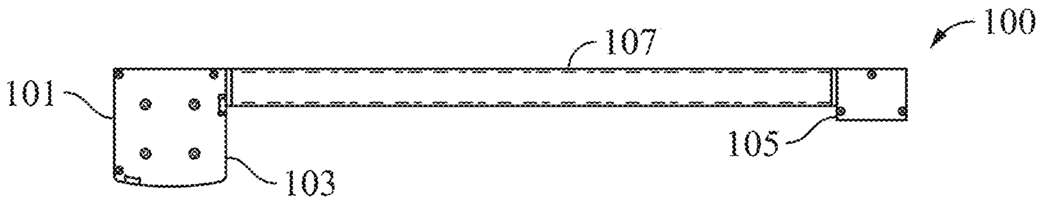
FIG. 2 illustrates a left side elevation view of the motorized door screen and shade assembly, according to some embodiments.
Figure 3:
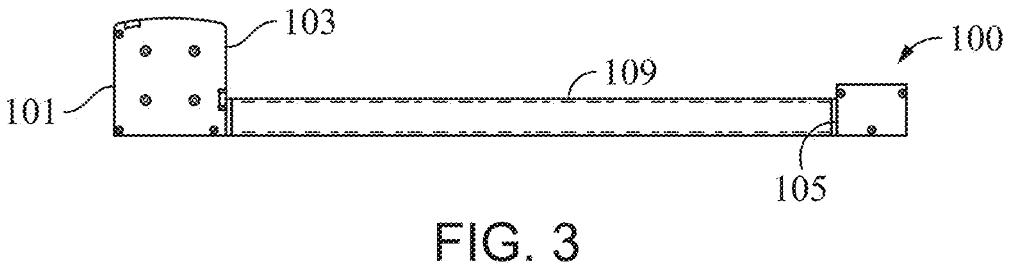
FIG. 3 illustrates a right side elevation view of the motorized door screen and shade assembly, according to some embodiments.
Figure 4:
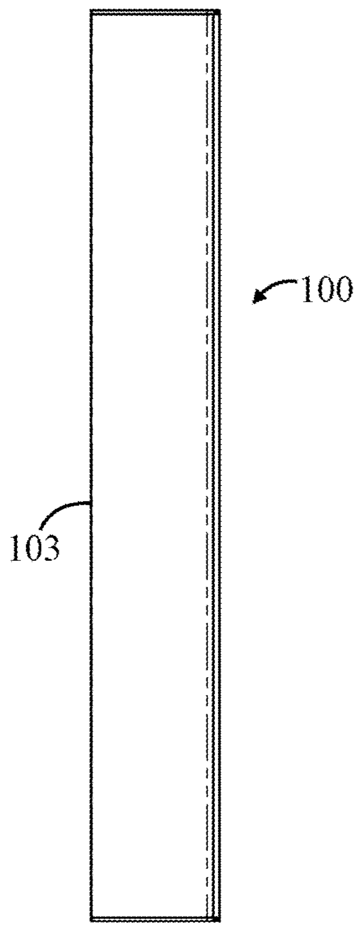
FIG. 4 illustrates a top plan view of the motorized door screen and shade assembly, according to some embodiments.
Figure 5:
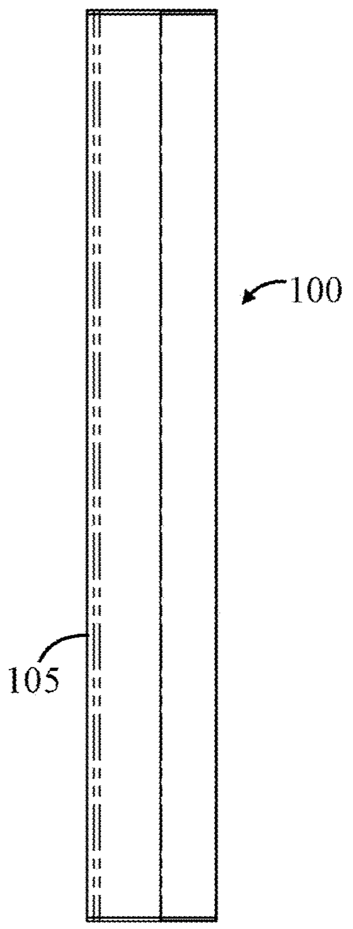
FIG. 5 illustrates a bottom plan view of the motorized door screen and shade assembly, according to some embodiments.
Figure 6:
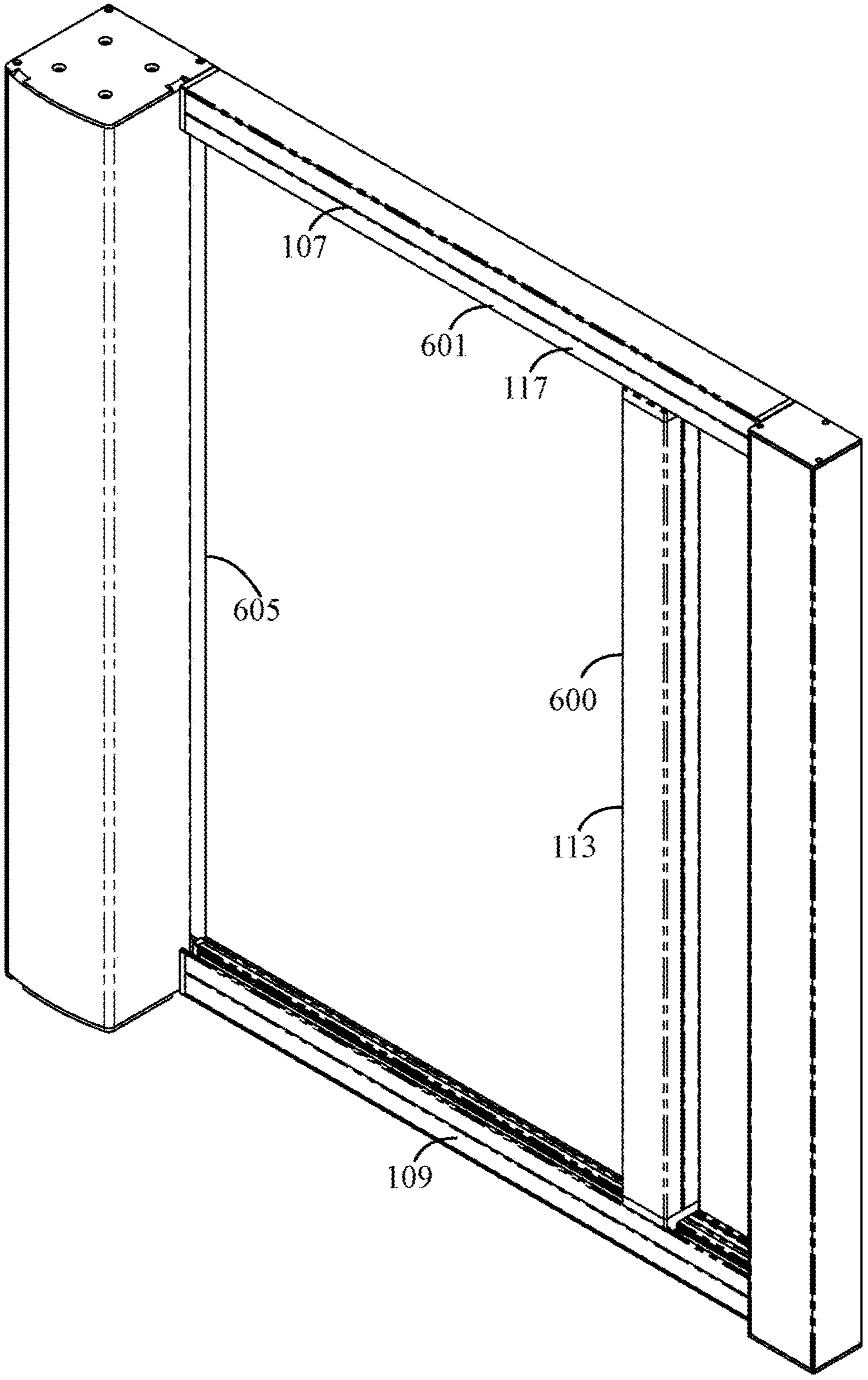
FIG. 6 illustrates a perspective view of the motorized door screen and shade assembly in an extended position, according to some embodiments.
Figure 7:
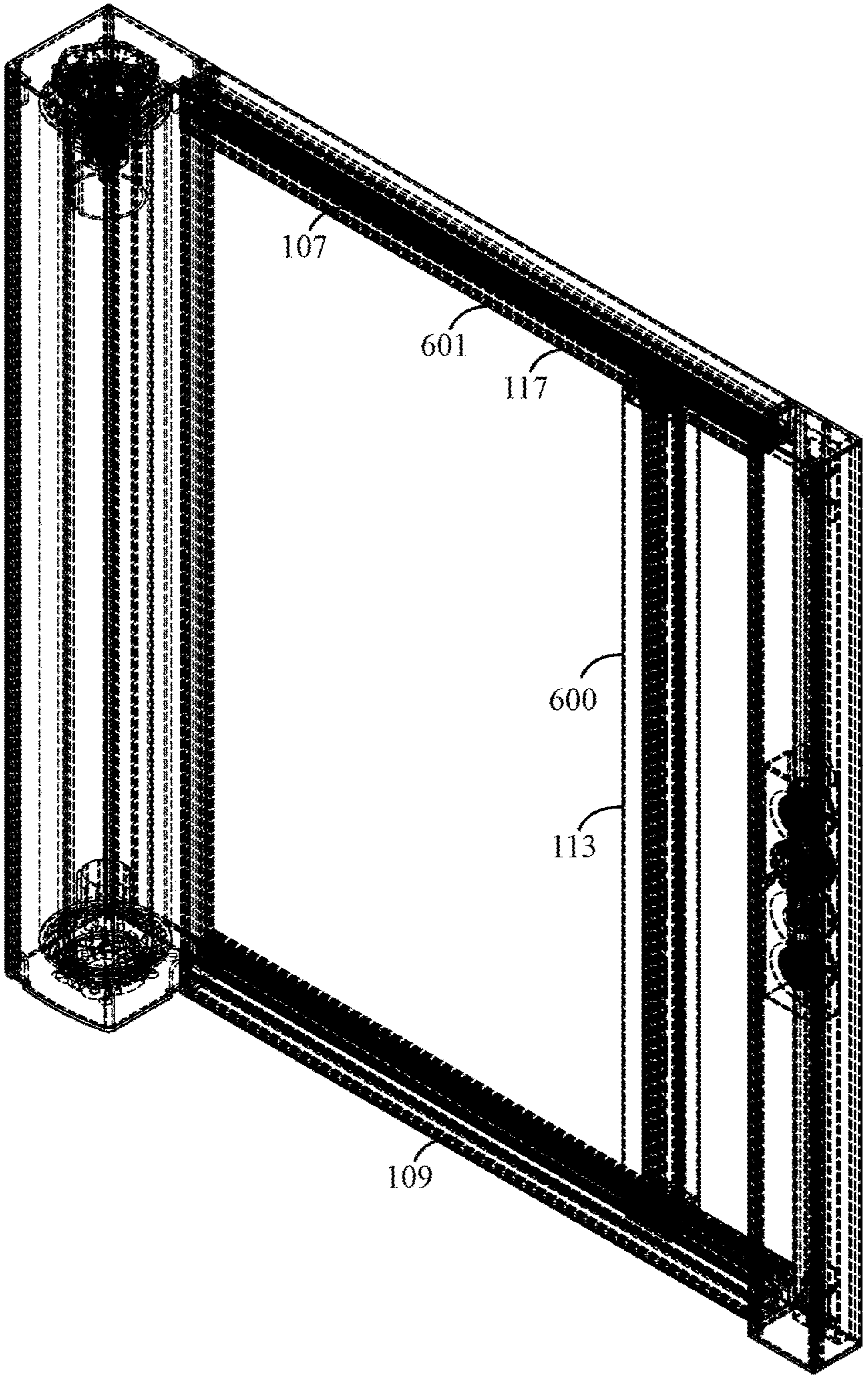
FIG. 7 illustrates a perspective view of the motorized door screen and shade assembly in a partially extended position, according to some embodiments.
Figure 8:
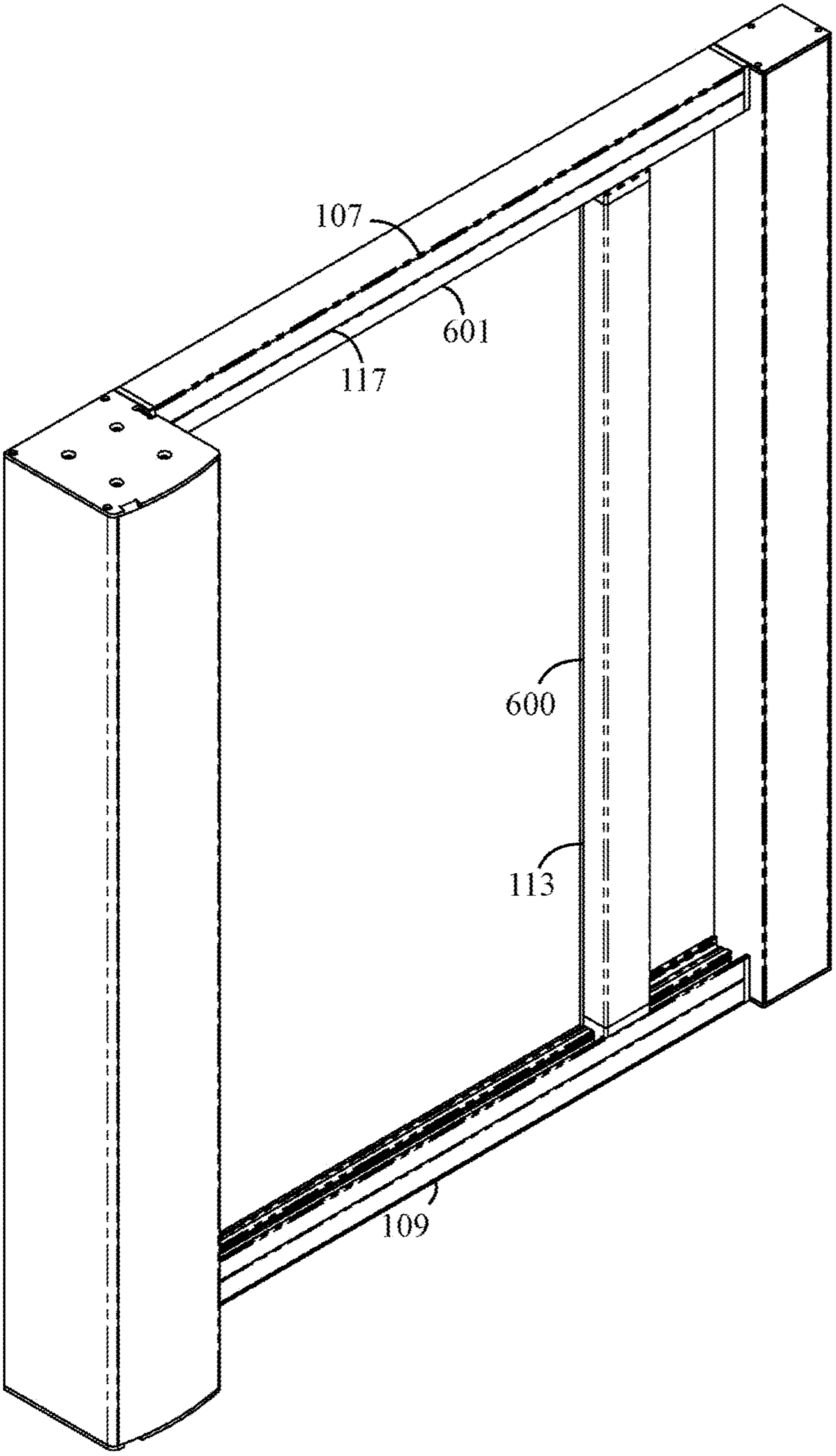
FIG. 8 illustrates a perspective view of the motorized door screen and shade assembly in a partially extended position, according to some embodiments.
Figure 9:
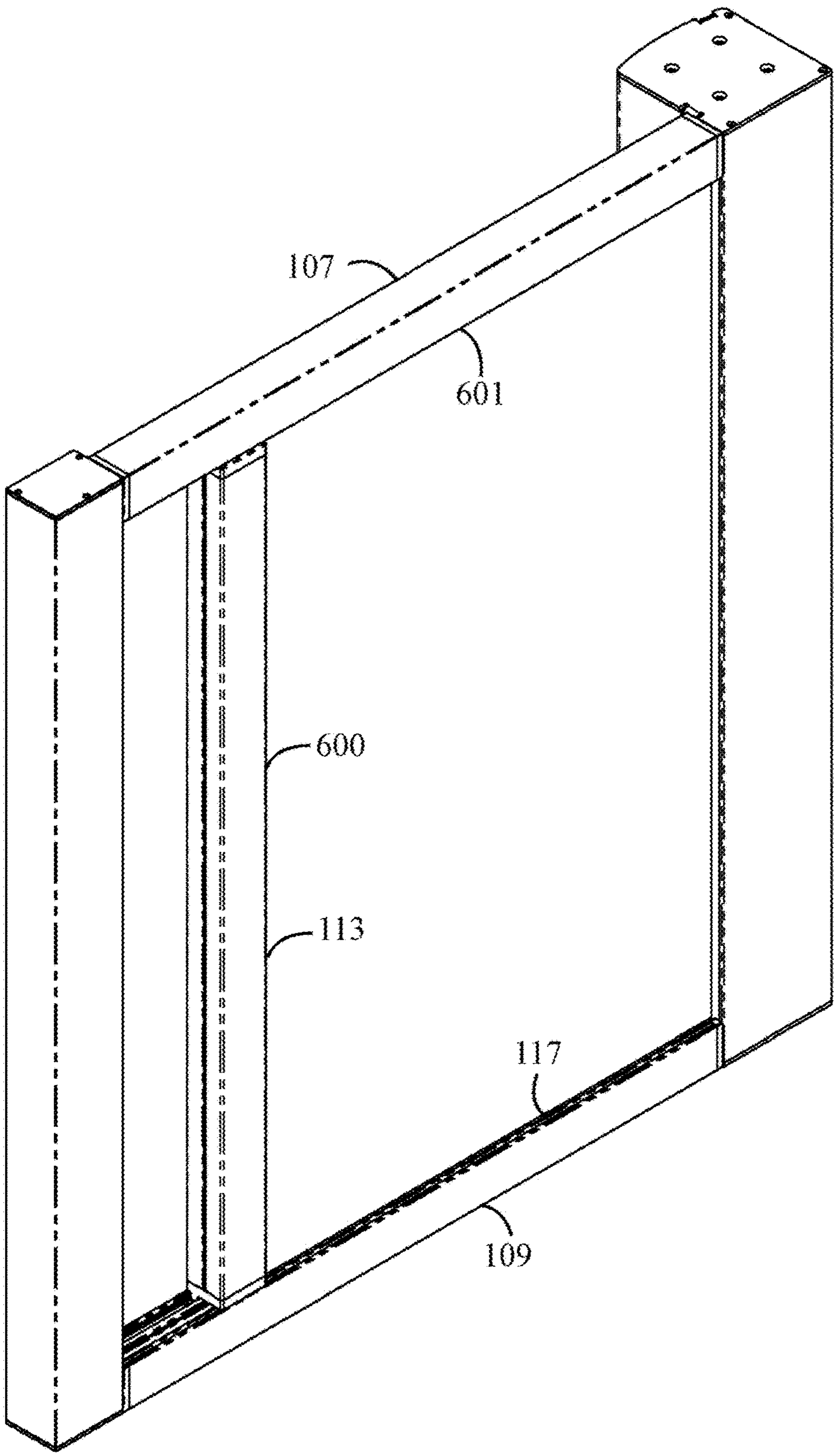
FIG. 9 illustrates a perspective view of the motorized door screen and shade assembly in a partially extended position, according to some embodiments.

FIGS. 2-5 illustrate the housing 101 of the assembly 100. FIG. 2 illustrates a top plan view of the housing 101 including the left side portion 103 and the right side portion 105 with the top portion 107 extending therebetween. FIG. 3 illustrates a bottom plan view of the left side portion 103, right side portion 105 and bottom portion 109 extending therebetween. FIG. 4 illustrates the left side portion 103 and FIG. 5 illustrates the right side portion 105.

FIGS. 6-9 illustrates a perspective view of the motorized door screen and shade assembly 100 in a partially extended position 600. The partially extending position 600 may be defined as the pull bar 113 being positioned along the length 601 of the track system 117 housed within the top portion 107 and bottom portion 109 of the housing 101. The track system 117 allows the pull bar to slidingly engages with the pull bar 113 allowing movement thereof along the length between the pull bar's 113 extending position 600 and the retracted position 605.

Figure 10:
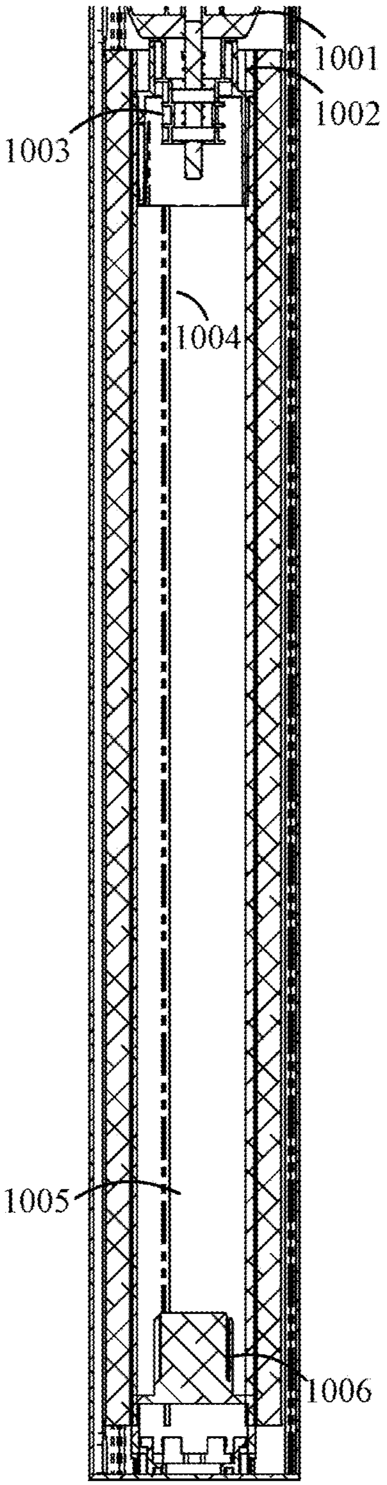
FIG. 10 illustrates a cutaway view of the interior components of the housing, according to some embodiments.
Figure 11:
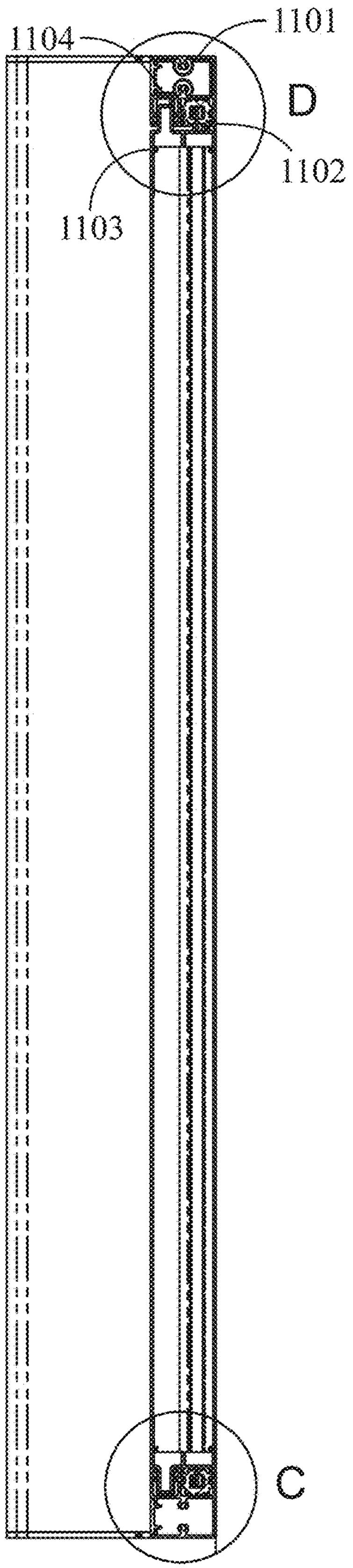
FIG. 11 illustrates a cutaway view of the interior components of the housing, according to some embodiments.

FIG. 10 illustrates a cutaway view of the interior components of the housing. The interior components include an idler receiver 1001, crown 1002, idler 1003, tube 1004, motor 1005, and second crown 1006. FIG. 11 illustrates a cutaway view of the interior components of the housing 100. A track 1101 (also shown on the opposing side in FIG. 13) is connected to a zipper retainer 1102 to retain the zipper in an appropriate position. A pull bar end cap 1103 and tension cord anchor 1104 are also included.

Figure 12:
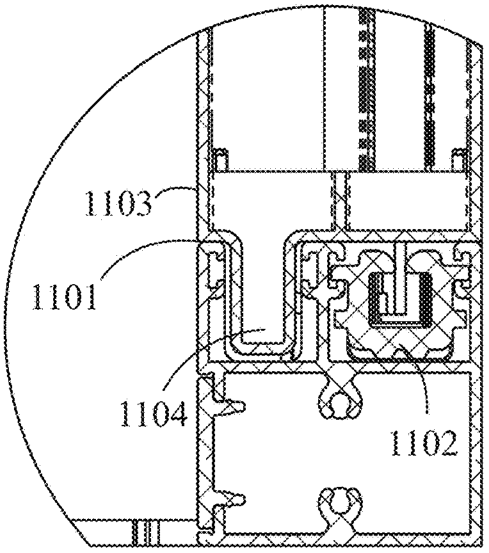
FIG. 12 illustrates a detail view of the interior components of the housing, according to some embodiments.
Figure 13:
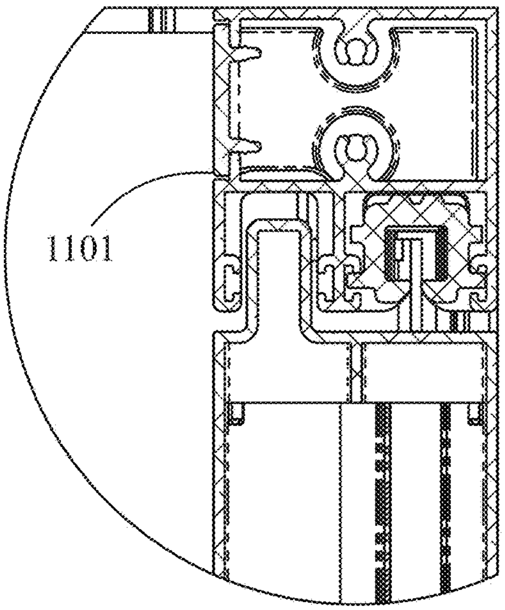
FIG. 13 illustrates a detail view of the interior components of the housing, according to some embodiments.

FIG. 12 illustrates a detail view of the interior components of the housing 100 including the A track 1101 is connected to a zipper retainer 1102 to retain the zipper in an appropriate position. Further, a pull bar end cap 1103 and tension cord anchor 1104 are also included. FIG. 13 illustrates the components shown in FIGS. 11-12 on the opposing side of the housing (i.e., the same components functioning in reverse with respect to those shown in FIGS. 11-12).

Figure 14:
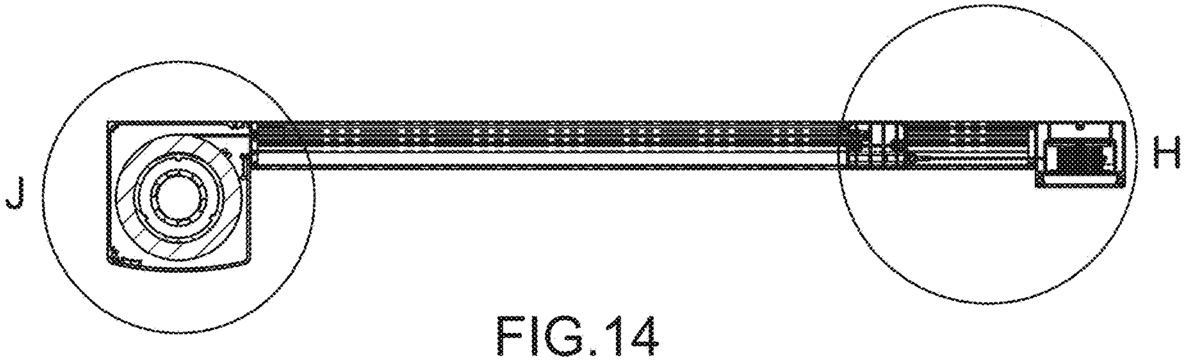
FIG. 14 illustrates a side elevation cutaway view of the interior components of the housing, according to some embodiments.
Figure 15:
FIG. 15 illustrates a cutaway view of the interior components of the housing, according to some embodiments.

FIG. 14 and FIG. 15 illustrates the housing including a single spring operating two gears. In another embodiment, illustrated in FIG. 15, two springs are illustrated to provide constant force such that as the motor unspools the screen, the tension from the gear assembly pulls the pull bar to allow the assembly to operate the screen in a later motion rather than a vertical motion.

Figure 16:
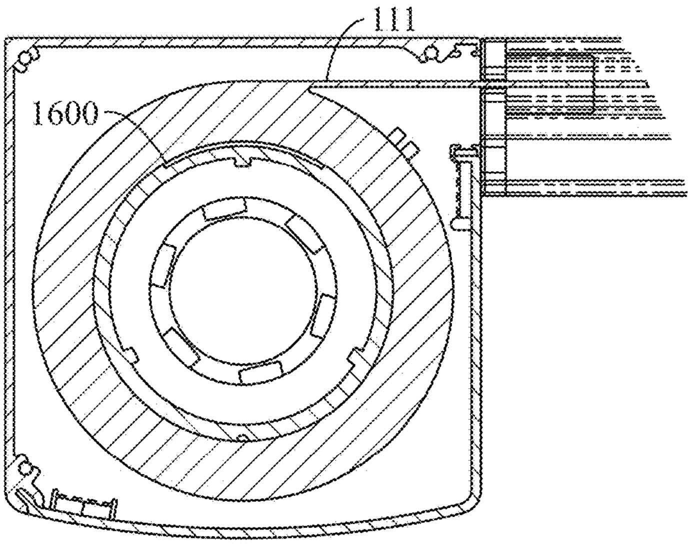
FIG. 16 illustrates a detail view of the interior components of the housing, according to some embodiments.
Figure 17:
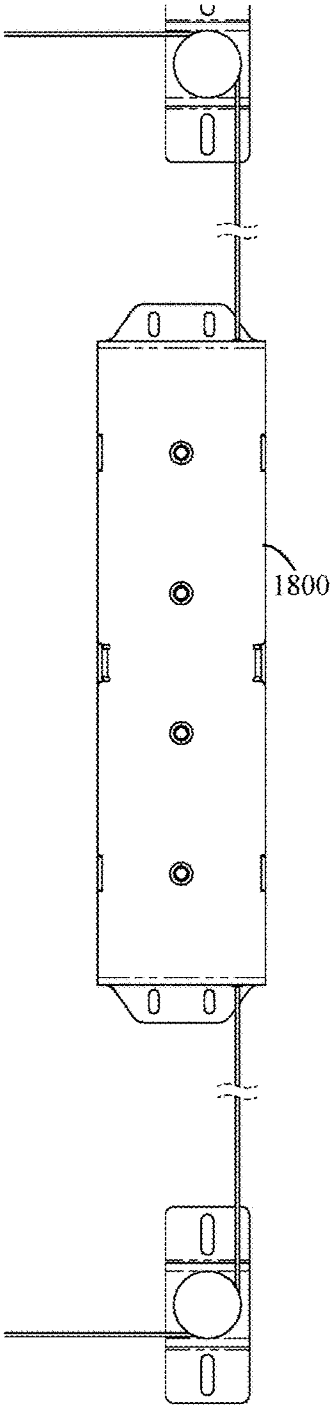
FIG. 17 illustrates a top plan view of the gear assembly, according to some embodiments.
Figure 18:
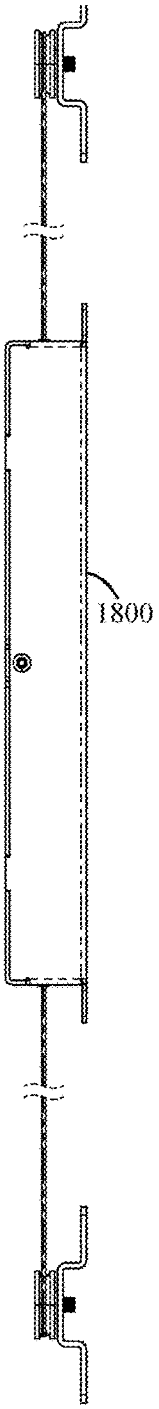
FIG. 18 illustrates a side elevation view of the gear assembly, according to some embodiments.
Figure 19:
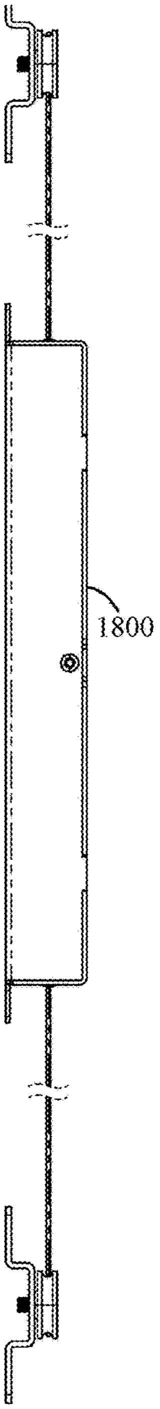
FIG. 19 illustrates a side elevation view of the gear assembly, according to some embodiments.
Figure 20:
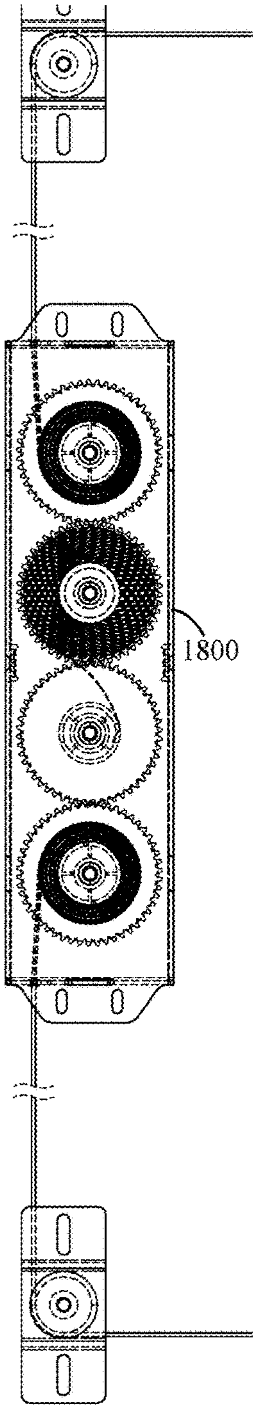
FIG. 20 illustrates a bottom plan view of the gear assembly, according to some embodiments.

FIG. 16 illustrates a detail view of the interior components of the housing including a tube 1600 which permits the motorized rolling and unrolling of the screen shade 111. The screen shade 111 may be constructed of a sufficiently flexible material to allow the screen shade 111 to roll or unroll about the tube 1600.

Figure 24:
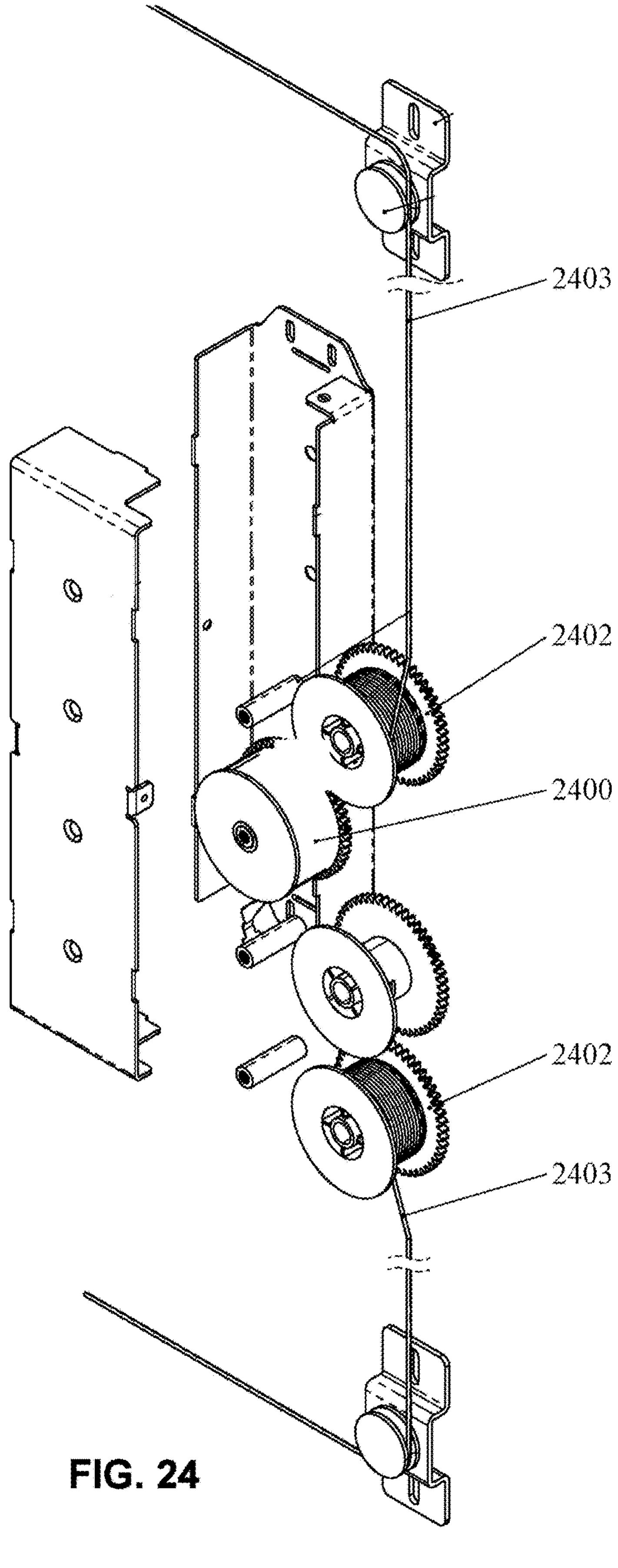
FIG. 24 illustrates an exploded view of the gear assembly and pull bar components, according to some embodiments.

FIGS. 17-20 illustrate the gear assembly 1800 according to an alternative embodiment. FIG. 22 and FIG. 23 illustrate the spool according to an alternative embodiment. Meanwhile FIG. 24 illustrates an exploded view of the assembly. A spring 2400 is provided in the gear assembly. The spring 2400 provides a constant pressure to the gear assembly 2401 includes gears a 2402 that spools a cord 2403. The cord wraps around a pulley which is attached to the pull bar which is attached to the pull bar caps.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A motorized door shade assembly comprising:

a housing containing a motor, the motor to operate a gear system including at least one pulley and a cord spooled about the pulley to open and close a shade screen via a pull bar;

two or more springs biased to maintain tension on the cord during motorized extension and retraction of the pull bar, the pull bar moving along a track system configured to lock a zipper into the track system, wherein the track system comprises a pair of channels, wherein one of the channels is configured to receive and engage the zipper fixed to opposing vertical edges of the shade screen, the zipper being guided and retained within the channels during extension and retraction, and wherein the pull bar moves horizontally to extend and retract the shade screen along at least one of a top, bottom, or side edge of the shade screen to extend and retract the shade screen, maintaining the zipper in continuous alignment with the track system, and wherein the shade screen is rollable upon a roller concealed within the housing when in a retracted position.

2. The motorized door shade assembly of claim 1, wherein the shade screen is constructed of a sufficiently flexible material to be retained within the housing.

3. The motorized door shade assembly of claim 1, wherein the housing contains the roller to roll and unroll the shade screen when transitioning between an extended position and a retracted position.

4. The motorized door shade assembly of claim 1, wherein the track system is positioned on a top portion and a bottom portion of the housing.

5. The motorized door shade assembly of claim 4, wherein the track system permits the sliding engagement between the track system and the shade screen.

6. The motorized door shade assembly of claim 1, wherein the gear system is comprised of a plurality of gears operated via the motor, the gear system contained within the housing.

7. The motorized door shade assembly of claim 1, wherein the gear system is attached to the cord connected to the pull bar to move the pull bar between the retracted position and the extended position.

8. The motorized door shade assembly of claim 1, wherein the at least one pulley includes a plurality of pulleys to receive the cord.

9. A motorized door shade assembly, comprising:

a housing including a left side portion, a right side portion, a top portion and a bottom portion, the housing containing a motor, the motor to operate a gear system including at least one pulley and a cord spooled about the pulley to open and close a shade screen via a pull bar; and two or more springs biased to maintain tension on the cord during motorized extension and retraction of the pull bar, the pull bar moving along a track system configured to lock a zipper into the track system provided on the top portion and the bottom portion, the track system including at least one channel to permit the sliding engagement between the shade screen and the track system, wherein the track system comprises a pair of channels, wherein one of the channels is configured to receive and engage the zipper fixed to opposing vertical edges of the shade screen, the zipper being guided and retained within the channels during extension and retraction, and wherein the pull bar moves horizontally to extend and retract the shade screen along at least one of a top, bottom, or side edge of the shade screen to extend and retract the shade screen, maintaining the zipper in continuous alignment with the track system, and wherein the shade screen is rollable upon a roller concealed within the housing when in a retracted position.

10. The motorized door shade assembly of claim 9, wherein the shade screen is constructed of a sufficiently flexible material to be retained within the housing.

11. The motorized door shade assembly of claim 9, wherein the housing contains the roller to roll and unroll the shade screen when transitioning between an extended position and a retracted position.

12. The motorized door shade assembly of claim 9, wherein the gear system is comprised of a plurality of gears operated via the motor, the gear system contained within the housing.

13. The motorized door shade assembly of claim 9, wherein the gear system is attached to the cord connected to the pull bar to move the pull bar between the retracted position and the extended position.

14. The motorized door shade assembly of claim 9, wherein the at least one pulley includes a plurality of pulleys to receive the cord.

15. A motorized door shade assembly, comprising:

a housing including a left side portion, a right side portion, a top portion and a bottom portion, the housing containing a motor, the motor to operate a gear system including at least one pulley and a cord spooled about the pulley to open and close a shade screen via a pull bar; and at least one spring biased to maintain tension on the cord during motorized extension and retraction of the pull bar in a lateral motion via the gear system, the gear system to spool the cord wrapped around the pulley attached to the pull bar, the pull bar moving along a track system configured to lock a zipper into the track system provided on the top portion and the bottom portion, the track system including at least one channel to permit the sliding engagement between the shade screen and the track system, wherein the track system comprises a pair of channels, wherein one of the channels is configured to receive and engage the zipper fixed to opposing vertical edges of the shade screen, the zipper being guided and retained within the channels during extension and retraction, and wherein the pull bar moves horizontally to extend and retract the shade screen along at least one of a top, bottom, or side edge of the shade screen to extend and retract the shade screen, maintaining the zipper in continuous alignment with the track system, and wherein the shade screen is rollable upon a roller concealed within the housing when in a retracted position.

* * * * *